(12) United States Patent
Zhong

(10) Patent No.: US 8,370,461 B2
(45) Date of Patent: Feb. 5, 2013

(54) MOBILE BROADBAND DEVICE AND METHOD FOR MANAGING MOBILE BROADBAND DEVICE

(75) Inventor: Zhen Zhong, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/364,838

(22) Filed: Feb. 2, 2012

(65) Prior Publication Data

US 2012/0209975 A1  Aug. 16, 2012

(30) Foreign Application Priority Data

Feb. 12, 2011 (CN) .......................... 2011 1 0036793

(51) Int. Cl.
*G06F 13/00* (2006.01)
(52) U.S. Cl. .................. 709/219; 709/225; 709/229
(58) Field of Classification Search .................. 709/217, 709/219, 223, 225, 227, 228, 229, 250
See application file for complete search history.

(56) References Cited

U.S. PATENT DOCUMENTS

| | | | |
|---|---|---|---|
| 7,574,494 B1 * | 8/2009 | Mayernick et al. | 709/222 |
| 8,121,626 B1 * | 2/2012 | Kirchhoff et al. | 455/466 |
| 2004/0236823 A1 | 11/2004 | La Gesse et al. | |
| 2005/0071423 A1 * | 3/2005 | Rajaniemi | 709/203 |
| 2005/0149564 A1 | 7/2005 | Jain et al. | |
| 2008/0301819 A1 * | 12/2008 | Bookman et al. | 726/27 |
| 2011/0295868 A1 * | 12/2011 | O'Farrell et al. | 707/756 |
| 2012/0124489 A1 | 5/2012 | Zhao et al. | |

FOREIGN PATENT DOCUMENTS

| | | |
|---|---|---|
| CN | 1671137 A | 9/2005 |
| CN | 1905476 A | 1/2007 |
| CN | 101150471 A | 3/2008 |
| CN | 101175310 A | 5/2008 |
| CN | 101175311 A | 5/2008 |
| CN | 101588378 A | 11/2009 |
| CN | 101655823 A | 2/2010 |
| CN | 101867565 A | 10/2010 |
| CN | 101932134 A | 12/2010 |
| CN | 101932135 A | 12/2010 |
| CN | 102158350 A | 8/2011 |
| EP | 2146476 A2 | 1/2010 |
| WO | WO 2007/012232 A1 | 2/2007 |

(Continued)

OTHER PUBLICATIONS

Office Action issued in corresponding Chinese Patent Application No. 201110036793.9, mailed Oct. 11, 2011.

(Continued)

*Primary Examiner* — Viet Vu
(74) *Attorney, Agent, or Firm* — Brinks Hofer Gilson & Lione

(57) ABSTRACT

A method for managing a mobile broadband device includes receiving, by the Web interface module via the Web protocol stack module, a management command that is sent by a user on a Web management page of a host device, where the Web management page is provided by the Web interface module; sending, by the Web interface module via the Web protocol stack module, the management command to the Web service implementing module; and receiving, by the Web service implementing module, the management command, and invoking an application programming interface that corresponds to the management command to execute the management command.

12 Claims, 6 Drawing Sheets

FOREIGN PATENT DOCUMENTS

WO    WO 2011/127707 A1    10/2011

OTHER PUBLICATIONS

Office Action issued in corresponding Chinese Patent Application No. 201110036793.9, mailed Dec. 22, 2011.

International Search Report issued in corresponding PCT Patent Application No. PCT/CN2012/071051, mailed May 17, 2012.

Office Action issued in corresponding Chinese Patent Application No. 201110036793.9, mailed May 31, 2012.

Extended European Search Report issued in corresponding European Patent Application No. 12152292.4, mailed Jun. 26, 2012.

International Search Report and Written Opinion of the International Searching Authority issued in corresponding PCT Patent Application No. PCT/CN2012/071051, mailed May 17, 2012.

* cited by examiner

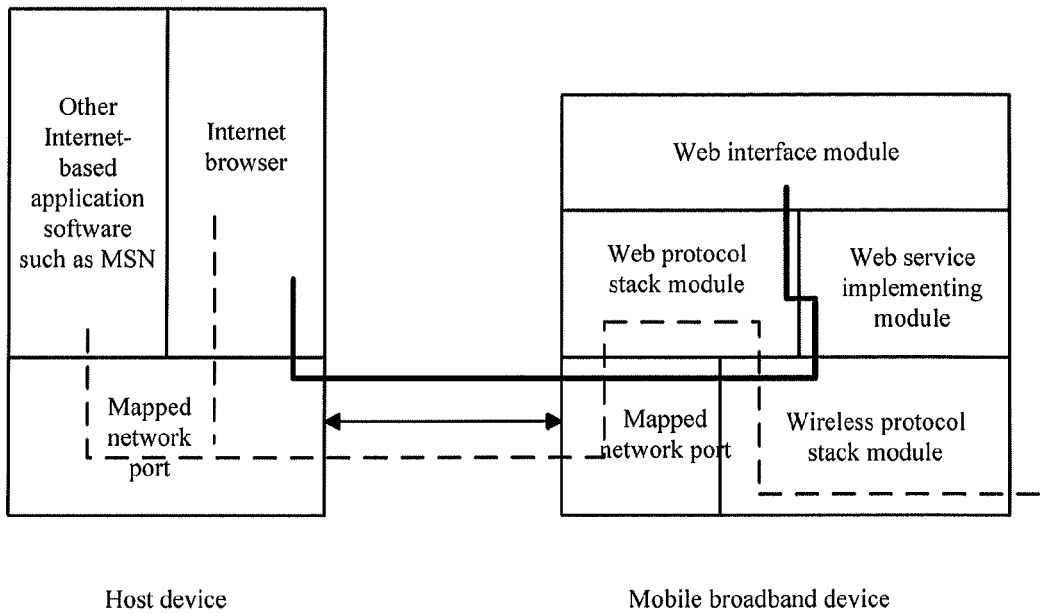

| A Web interface module receives, via a Web protocol stack module, a management command that is sent by a user on a Web management page of a host device, where the Web management page is provided by the Web interface module | S110 |

| The Web interface module sends the management command to a Web service implementing module via the Web protocol stack module | S120 |

| The Web service implementing module receives the management command, and invokes an application programming interface that corresponds to the management command to execute the management command | S130 |

FIG. 2

MOBILE BROADBAND DEVICE AND METHOD FOR MANAGING MOBILE BROADBAND DEVICE

CROSS-REFERENCE TO RELATED APPLICATION

This application claims priority to Chinese Patent Application No. 201110036793.9, filed on Feb. 12, 2011, which is hereby incorporated by reference in its entirety.

FIELD OF THE APPLICATION

The present application relates to the communications field, and in particular, to a mobile broadband device and a method for managing the mobile broadband device.

BACKGROUND OF THE APPLICATION

The Mobile Broadband (MBB) field is one of the fields booming in recent years, where a "3G (3rd-Generation, '3G' for short, that is, the third generation mobile communication technology) data card" or a "3G USB (Universal Serial Bus, 'USB' for short, that is, universal serial bus) Modem (Modulator-demodulator, that is modulator and demodulator)" is a typical mobile broadband device.

At present, all mainstream mobile broadband devices of manufacturers in the industry are accompanied with a corresponding PC (personal computer, "PC" for short, that is, personal computer) client, which is used for managing the mobile broadband devices. A mobile broadband device needs to be inserted into a PC for use. At present, a mainstream interface between the mobile broadband device and the PC is a USB interface. However, a few mobile broadband devices also use interfaces such as Express to connect to PCs. After being connected to the PC, the mobile broadband device is virtually "mapped" to a serial port on the PC by driver software. Thereby, a PC client program may perform service interaction with the mobile broadband device through an "AT (Attention) command", so that the PC may implement services such as dial-up access, sending of a short message, and a phone book.

However, OSs (operating systems, "OSs" for short, that is, operating systems) on PCs are not unified, and almost every OS platform has its own special development platform and programming language. Therefore, cross-platform support of a client cannot be implemented. Usually, the OSs that are used on PCs mainly include Windows, MacOS, and Linux, and each OS has a corresponding sub-version, where the Linux has many versions (for example, Ubuntu, Fedora, Debian, and so on). The mobile broadband devices are used not only in PCs but also in embedded devices. The OSs used in the embedded devices are more diversified, for example, the OSs used in the embedded devices include WindowsCE, WindowsMobile, Android, various embedded Linux OSs, and so on.

Though a few technologies in the industry are declared to support cross-platform programming, the support is "limited support", for example, only a mainstream OS other than an embedded OS on the PC is supported. Therefore, for a mobile broadband device, a client corresponding to each OS platform should be developed, and the cross-platform support of the client cannot be implemented, which not only increases development difficulty but also results in an increase of development cost. In addition, a problem that the mobile broadband device can be used only after the client is installed, a problem that the client occupies large storage space so that a hardware cost is high, and other problems may occur.

SUMMARY OF THE APPLICATION

Embodiments provide a mobile broadband device and a method for managing the mobile broadband device. Thereby, a host device may manage the mobile broadband device without a client, which solves a problem of cross-platform support of the client and enables the mobile broadband device to have merits of being free from installation, easy development, and low cost.

On the one hand, an embodiment provides a method for managing a mobile broadband device. The mobile broadband device includes a Web protocol stack module, a Web interface module, and a Web service implementing module. The method includes:

receiving, by the Web interface module via the Web protocol stack module, a management command that is sent by a user on a Web management page of a host device, where the Web management page is provided by the Web interface module;

sending, by the Web interface module via the Web protocol stack module, the management command to the Web service implementing module; and receiving, by the Web service implementing module, the management command, and invoking an application programming interface that corresponds to the management command to execute the management command.

On the other hand, an embodiment provides a mobile broadband device. The mobile broadband device includes a Web protocol stack module, a Web interface module, and a Web service implementing module, where:

the Web interface module is configured to provide a Web management page for a user to manage the mobile broadband device in Web mode on a host device, and the Web interface module is further configured to receive a management command that is sent by the user on the Web management page and send the management command to the Web service implementing module;

the Web service implementing module is configured to receive the management command, and invoke an application programming interface that corresponds to the management command to execute the management command; and the Web protocol stack module is configured to forward data between the Web interface module and the Web service implementing module, and present, on the host device, the Web management page provided by the Web interface module.

Based on the foregoing technical solutions, with the mobile broadband device and the method for managing the mobile broadband device in embodiments, the mobile broadband device is managed in Web mode. Thereby, the host device using the mobile broadband device does not require a client any longer, which completely solves the problem of cross-platform support of the client and enables the mobile broadband device to have the merits of being free from installation, easy development, and low cost.

BRIEF DESCRIPTION OF THE DRAWINGS

To make the technical solutions in embodiments clearer, the accompanying drawings for illustrating the embodiments are briefly described below. Evidently, the accompanying drawings illustrate only some exemplary embodiments, and persons of ordinary skill in the art can derive other drawings from such accompanying drawings without any creative effort.

FIG. 1 shows an application scenario of a method for managing a mobile broadband device according to an embodiment;

FIG. 2 is a schematic diagram of a method for managing a mobile broadband device according to an embodiment;

DETAILED DESCRIPTION OF THE EMBODIMENTS

Figure 3:
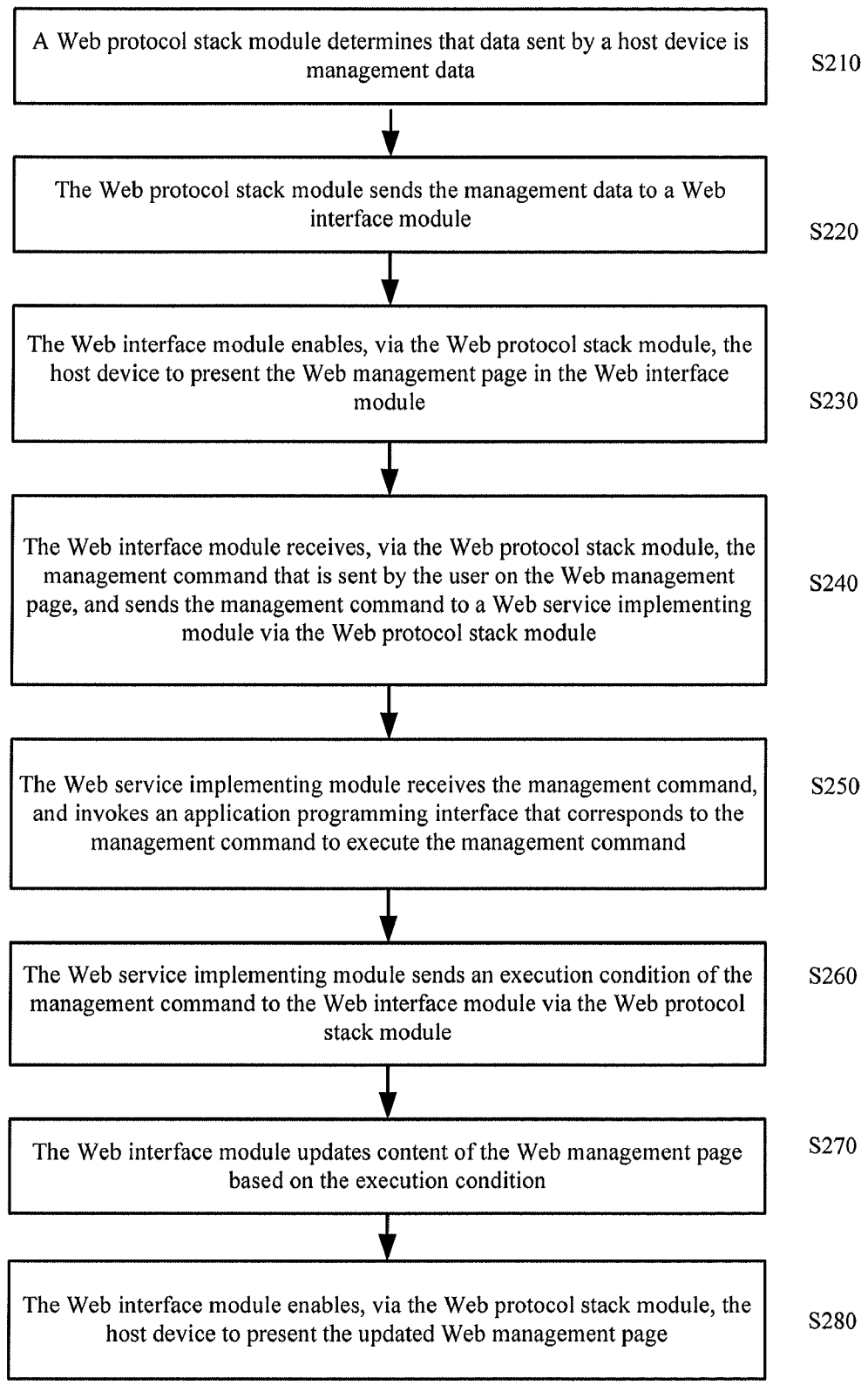
FIG. 3 is a schematic diagram of a method for managing a mobile broadband device according to another embodiment.

The technical solutions provided by the embodiments are described clearly and completely below with reference to the accompanying drawings. Apparently, the described embodiments are merely a part of the embodiments rather than all the embodiments. All other embodiments that persons of ordinary skill in the art derive without creative efforts based on the embodiments also fall within the protection scope of the claims.

FIG. 1 shows an application scenario of a method for managing a mobile broadband device according to an embodiment. As shown in FIG. 1, after the mobile broadband device according to this embodiment is connected to a host device, the mobile broadband device and the host device may exchange management data and service data through a mapped network port.

Generally, the mobile broadband device may have a USB interface. After the mobile broadband device is connected to the host device through the USB interface, the mobile broadband device may be virtually mapped to different devices through a corresponding driver. For example, a conventional PC client generally uses a serial port to receive and send an AT command to exchange management data with the mobile broadband device, and therefore, a device type, displayed on the host device, of a conventional mobile broadband device may be "serial port"; when the conventional PC client uses a Modem port to complete an exchange of service data with the mobile broadband device, the device type, displayed on the host device, of the conventional mobile broadband device may also be "Modem device". In this embodiment, the mobile broadband device and the host device implement an exchange of management data and implement an exchange of service data through the network port. Therefore, the device type, displayed on the host device, of the mobile broadband device according to this embodiment may also be "network adapter/network port device".

As shown in FIG. 1, according to the mobile broadband device in this embodiment, the host device does not require a client and only requires a common Internet (Internet) browser, for example, IE and Firefox. A user may manage the mobile broadband device in Web mode through the Internet browser, for example, perform service management such as sending of a short message and dial-up access. A thick solid line in FIG. 1 indicates management data from the Internet browser. Therefore, the mobile broadband device according to this embodiment may be applied in any host device with an Internet browser, including a PC and various embedded devices.

A dotted line in FIG. 1 indicates a flow direction of service data. The service data may come from the Internet browser, for example, the home page of Yahoo, or come from Internet-based application software, for example, an MSN (Microsoft Service Network, "MSN" for short, that is, Microsoft Service Network). The management data and service data are transmitted from the host device to the mobile broadband device through the mapped network port of the mobile broadband device.

In this embodiment, the data from the host device includes management data and service data, where the management data generally relates to an operation performed on the mobile broadband device itself, while the service data generally relates to an operation based on an Internet application. For example, for operations related to querying of a state of the mobile broadband device (including traffic and signal strength), a short message service, a phone book service, and so on, the corresponding data is management data; for operations such as Internet access and a QQ chat, the corresponding data is service data.

It should be understood that FIG. 1 shows only an exemplary interconnection between the mobile broadband device and the host device according to this embodiment, where the flow directions indicated by the thick solid line and the dotted line are bidirectional and exemplary, and shall not be construed as a limitation on the claims.

FIG. 2 is a schematic diagram of a method 100 for managing a mobile broadband device according to an embodiment. The method 100 includes:

S110. A Web interface module of the mobile broadband device receives, via a Web protocol stack module of the mobile broadband device, a management command that is sent by a user on a Web management page of a host device, where the Web management page is provided by the Web interface module.

S120. The Web interface module sends the management command to a Web service implementing module via the Web protocol stack module.

S130. The Web service implementing module receives the management command, and invokes an application programming interface corresponding to the management command to execute the management command.

The mobile broadband device may include the Web protocol stack module, the Web interface module, and the Web service implementing module. The Web interface module is an interface part for service implementation, and is configured to provide the Web management page for a user to manage the mobile broadband device in Web mode on the host device. The Web management page may include some common HTML (HyperText Markup Language, "HTML" for short, that is, hypertext markup language) Web pages, which may include a JavaScript (a JAVA script language) and a CSS (Cascading Style Sheets, "CSS" for short, that is, cascading style sheets) script. These scripts are standard HTML page elements.

The Web service implementing module is a logical part for service implementation, and provides the application programming interface for the Web interface module to invoke. Taking a "short message" service as an example, the Web service implementing module needs to implement lower-layer receiving and lower-layer sending of a short message, and message encoding and decoding, while the Web interface module needs to implement such functions on the Web management page as managing a short message and a mail box, and editing a new SMS message.

The Web protocol stack module includes an HTTP (HyperText Transfer Protocol, "HTTP" for short, that is, HyperText Transfer Protocol) Server (server) submodule, which enables the mobile broadband device to become a "Web server". Thereby, an Internet browser on the host device can access an HTML Web page provided by the Web interface module. In addition, the Web protocol stack module is also configured to forward data between the Web interface module and the Web service implementing module and be responsible for routing service data.

In the method for managing a mobile broadband device according to this embodiment, the host device manages the mobile broadband device in Web mode by using an Internet browser, so that the host device using the mobile broadband device does not require a client any longer. Thereby, a problem of cross-platform support of the client can be solved completely. The method in this embodiment does not require a client to be installed on the host device. Therefore, complex development and storage of clients with multiple operating systems are avoided, and a problem that an OS needs to be restarted after client installation is solved. In this way, development difficulty can be reduced, user experience is improved, a requirement on storage space of the mobile broadband device is reduced, and thereby a cost of the mobile broadband device is reduced.

In addition, in this embodiment, the Web interface module in the mobile broadband device is the interface part for service implementation, while the Web service implementing module is the logical part for service implementation, so that an interface and service implementation of a function module of the mobile broadband device are separated. In this way, layers are clearer, and development, debugging, and maintenance are easier, that is, the method for managing a mobile broadband device in this embodiment has merits of loose coupling, good scalability, and good maintainability.

FIG. 3 is a schematic diagram of a method 200 for managing a mobile broadband device according to another embodiment.

In S210, a Web protocol stack module identifies whether data sent by a host device is management data or service data. In this embodiment, the Web protocol stack module may also include a TCP/IP (Transmission Control Protocol/Internet Protocol, "TCP/IP" for short, that is, Transmission Control Protocol/Internet Protocol) protocol stack submodule, configured to identify whether the data sent by the host device is the management data or the service data. For example, the TCP/IP protocol stack submodule may perform identification according to an IP address. Usually, data directed to 192.168.1.1 is management data. The TCP/IP protocol stack submodule may also perform data identification according to a DNS domain name or an IP port number to determine whether the data is the management data or the service data.

In S220, after determining that the data is the management data, the Web protocol stack module sends the management data to a Web interface module. Specifically, after determining that the data from the host device is the management data, the TCP/IP protocol stack submodule of the Web protocol stack module sends the data to the HTTP server submodule of the Web protocol stack module, and the HTTP server submodule sends the management data to the Web interface module.

In S230, through the HTTP server submodule of the Web protocol stack module, the Web interface module enables the host device to present a Web management page provided by the Web interface module.

Therefore, the user may open the Web management page through an Internet browser, and perform service management on the mobile broadband device through the Web management page. For example, the user opens the Internet browser, and enters a Web address or an IP address of the mobile broadband device in the address bar of the browser, where the Web address is usually http://192.168.1.1/index.html. In this way, the Web management page provided by the Web interface module can be opened, and the user may perform management on services such as dial-up access and a short message service.

In this embodiment, when the user enters a management command on the opened Web management page, the Web interface module receives, via the HTTP server submodule of the Web protocol stack module, the management command that is sent by the user on the Web management page, and sends the management command to a Web service implementing module via the HTTP server submodule (as shown in S240 in FIG. 3); the Web service implementing module receives the management command, and invokes an application programming interface that corresponds to the management command to execute the management command (as shown in S250).

In S250, the Web service implementing module may include: a service invoking submodule, and a service container submodule and/or a service providing submodule. The service invoking submodule is configured to receive the management command and distribute the management command to the service container submodule or the service providing submodule of the Web service implementing module to execute the management command. The service container submodule is configured to execute a service operation instruction in the management command. The service providing submodule is configured to parse the service operation instruction and execute a corresponding lower-layer operation.

In this embodiment, management commands that are sent by the user through the Web management page of the Internet browser relate to operations performed on the mobile broadband device itself, and therefore, the management commands are the management data, while the data that is sent by the user through other Web pages of the browser or other Internet-based application software belongs to the service data.

In the method for managing a mobile broadband device in this embodiment, the host device manages the mobile broadband device in Web mode. Thereby, the host device using the mobile broadband device does not require a client any longer, which completely solves a problem of cross-platform support of the client and enables the mobile broadband device to have merits of being free from installation, easy development, and low cost.

In this embodiment, the method 200 for managing a mobile broadband device may further include:

S260. The Web service implementing module sends an execution condition of the management command to the Web interface module via the Web protocol stack module.

S270. The Web interface module updates content of the Web management page based on the execution condition.

S280. The Web interface module enables, via the Web protocol stack module, the host device to present the updated Web management page.

The Web protocol stack module is configured to forward data between the Web interface module and the Web service implementing module; in addition, the Web protocol stack module is further configured to assist the Web interface module, so that the host device presents the Web management page provided by the Web interface module.

Therefore, the method for managing a mobile broadband device according to this embodiment completely solves the problem of cross-platform support of the client and enables the mobile broadband device to have the merits of being free from installation, easy development, and low cost.

Figure 4:
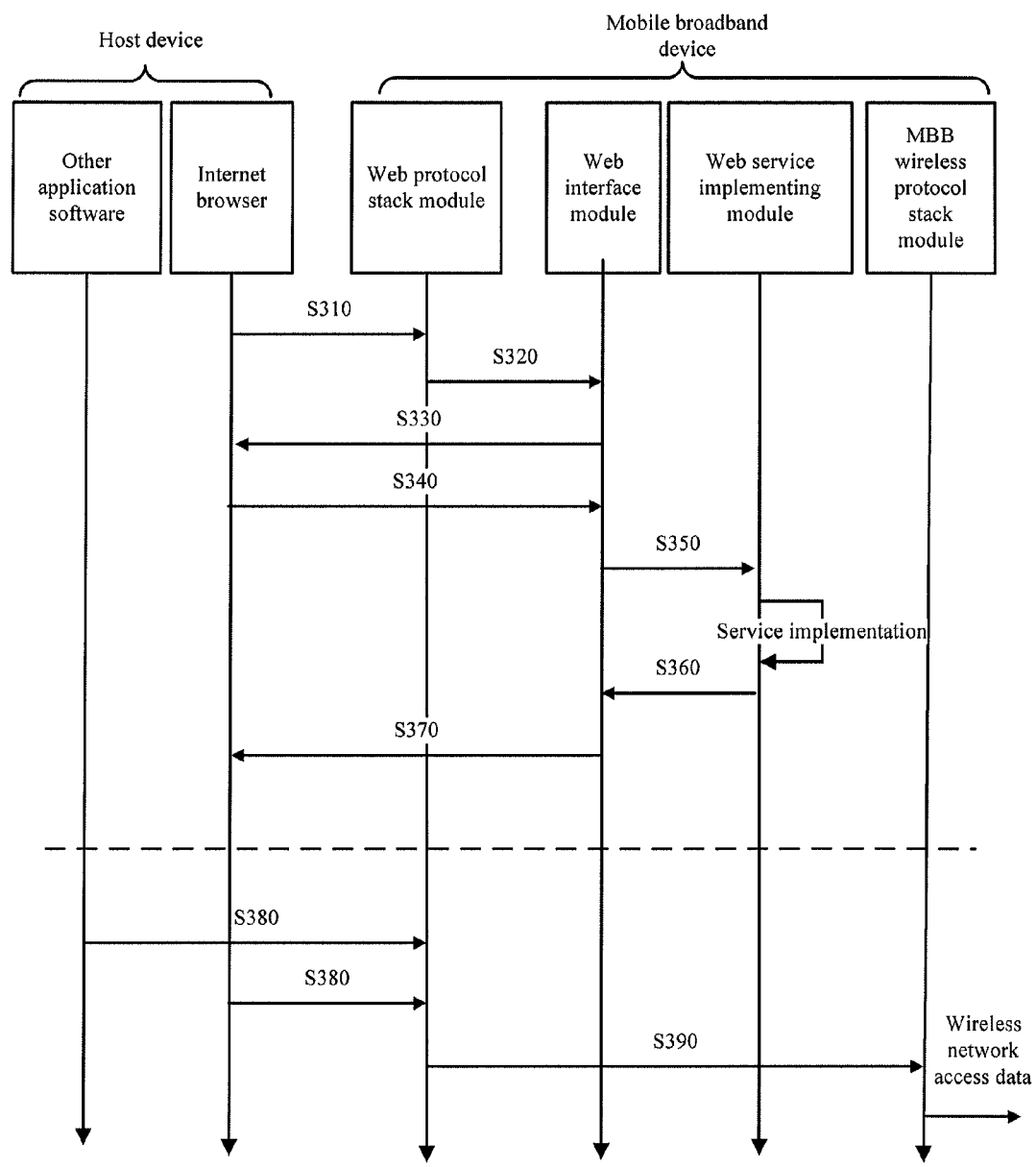
FIG. 4 is a time sequence diagram of a method for managing a mobile broadband device according to still another embodiment.

FIG. 4 is a time sequence diagram of a method for managing a mobile broadband device according to still another embodiment. As shown in FIG. 4, the mobile broadband device identifies data from a host device to determine whether the data is management data or service data. If a Web protocol stack module determines that the received data is management data (S310), the Web protocol stack module sends the data to a Web interface module (S320), and the Web interface module enables, via the Web protocol stack, the host device to present a Web management page in the Web interface module (S330). When the Web interface module receives, via the Web protocol stack module, a management command that is sent by a user on the Web management page of the host device (S340), the Web interface module sends the management command to a Web service implementing module via the Web protocol stack module (S350); the Web service implementing module invokes an application programming interface that corresponds to the management command to execute the management command, and sends an execution condition of the management command to the Web interface module via the Web protocol stack module (S360); the Web interface module updates content of the Web management page based on the execution condition of the management command, and enables, via the Web protocol stack module, the host device to present the updated Web management page (S370).

If the Web protocol stack module determines that the received data is service data (S380), where the service data may come from an Internet browser, or come from other Internet-based application software, the Web protocol stack module forwards the service data to a wireless protocol stack module of the mobile broadband device, so that the host device accesses a wireless network via the wireless protocol stack module (S390). In this case, an HTTP server submodule in the Web protocol stack module is configured to route the service data.

Therefore, the method for managing a mobile broadband device in this embodiment completely solves a problem of cross-platform support of a client and enables the mobile broadband device to have merits of being free from installation, easy development, and low cost.

Figure 5:
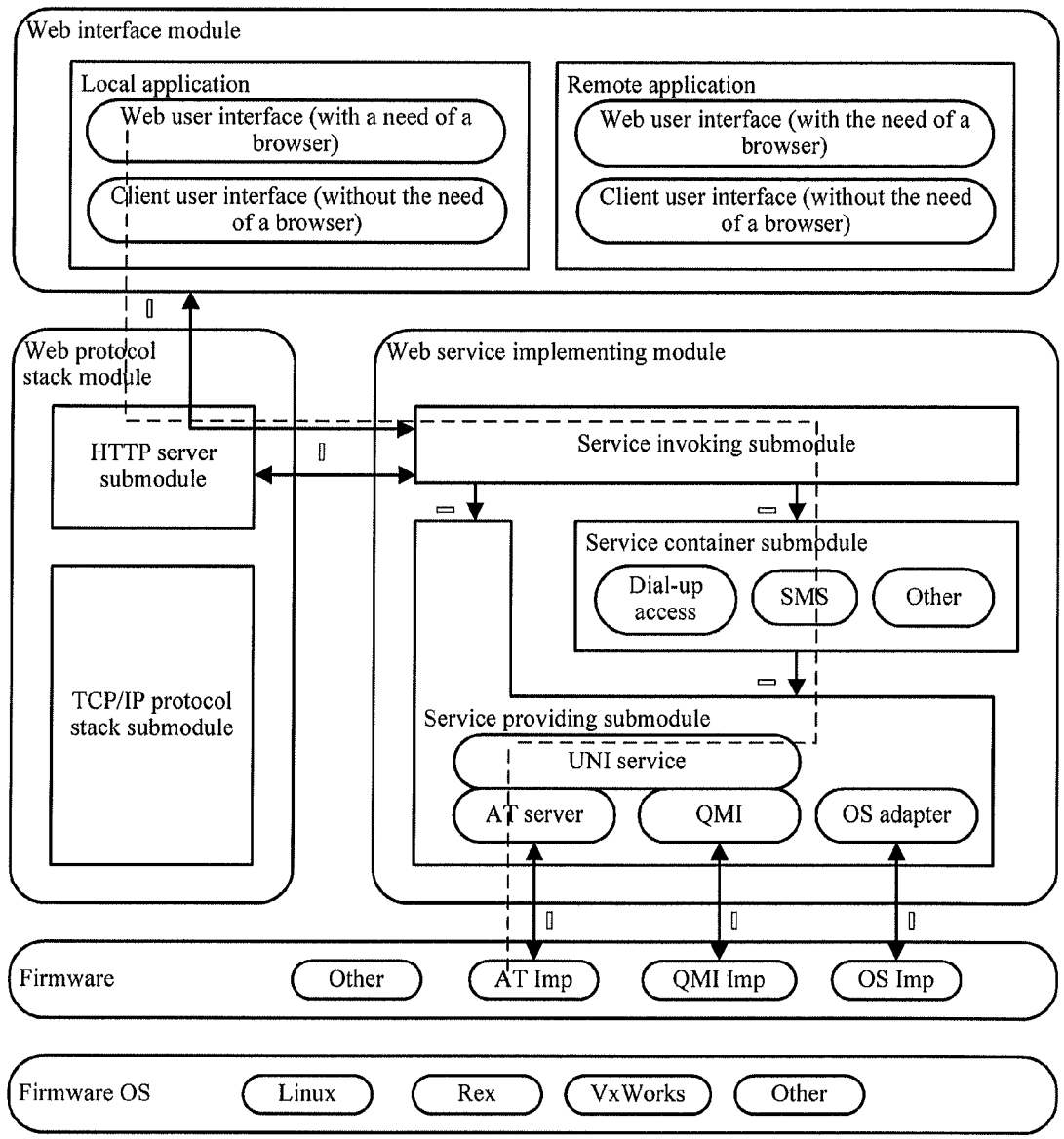
FIG. 5 is a block diagram of a method for managing a mobile broadband device according to still another embodiment.

The following describes the method for managing a mobile broadband device in this embodiment by taking a short message service as an example. FIG. 5 is a block diagram of a mobile broadband device. The mobile broadband device may include a Web interface module, a Web protocol stack module, and a Web service implementing module. The Web interface module may include a Web user interface (WebUI), and this user interface needs to be opened through a browser. The Web interface module may further include a client user interface (ClientUI), and this user interface can be opened without a browser. Therefore, the mobile broadband device and the method according to this embodiment can not only implement management on the mobile broadband device in Web mode but also perform management on the mobile broadband device in conventional PC client mode.

The Web protocol stack module may include an HTTP server submodule and a TCP/IP protocol stack submodule. The TCP/IP protocol stack submodule may be configured to identify whether data sent by a host device is management data or service data. The HTTP server submodule may be configured to forward data between the Web interface module and the Web service implementing module, and assist the Web interface module, so that the host device presents a Web management page provided by the Web interface module.

The Web service implementing module may include a service invoking submodule (SIL, Service Invocation Layer) and a service container submodule (Service Container) and/or a service providing submodule (SPI, Service Provider Interface), where the service invoking submodule is configured to receive a management command and distribute the management command to the service container submodule or the service providing submodule. The service invoking submodule invokes an application programming interface (API, Application Programming Interface) of interface □ to perform parsing, and distributes the management command to the service container submodule or the SPI for implementation. The service container submodule is configured to execute the management command, where the service container submodule is a set of various specific service implementing components. For example, an SMS component is mainly responsible for encoding and decoding of a short message, and a dial-up access component is mainly responsible for implementing a dial-up access protocol. The service providing submodule is configured to exchange information between the service container submodule and firmware in the mobile broadband device. The SPI encapsulates the firmware, and performs different types of encapsulation for different device software and hardware platforms. FIG. 5 shows two examples, where an AT command is a set of management interface commands that is defined by the 3GPP (3rd Generation Partnership Project, 3rd Generation Partnership Project) standard, and is relatively standardized; QMI is an interface implemented on a Qualcom (Qualcom) platform, and is a set of private interfaces. Because different device platforms may have different OSs, for a purpose of normalization of software development, an OS adapter encapsulates an OS programming interface. Therefore, a difference between OSs is invisible to a specific component (such as the SMS) of the Web service implementing module. The OS adapter defines an OS adaptation layer interface; when different OS platforms are integrated, it is only necessary to implement "OS Imp" through this interface.

The firmware in FIG. 5 is an original software module in the MBB device, and is configured to implement the lowest-layer service and protocol processing. The firmware further includes the foregoing wireless protocol stack module of the MBB device. The firmware OS is an embedded OS, embedded Linux and VxWorks are typical embedded OSs, and Rex is a private embedded OS of the Qualcom platform. In FIG. 5, □, □, □, □, □, and □ indicate interfaces. Interface □ is a Web service interface; this interface is based on HTTP and an XML (Extensible Markup Language, that is, extensible markup language) and is a logical interface; and HTTP data on a physical channel can be exchanged between the Web interface module and the Web service implementing module only after being forwarded by the HTTP server submodule. Interface □ is an HTTP transceiver interface and is generally an application programming interface. Interface □ is an internal interface and is also generally an application programming interface. Interfaces □ and □ are communication adaptation layer interfaces, including interfaces for sending and receiving AT and QMI commands, and are also generally application programming interfaces. Interface □ is an OS adaptation layer interface, and is generally an application programming interface.

Figure 6:
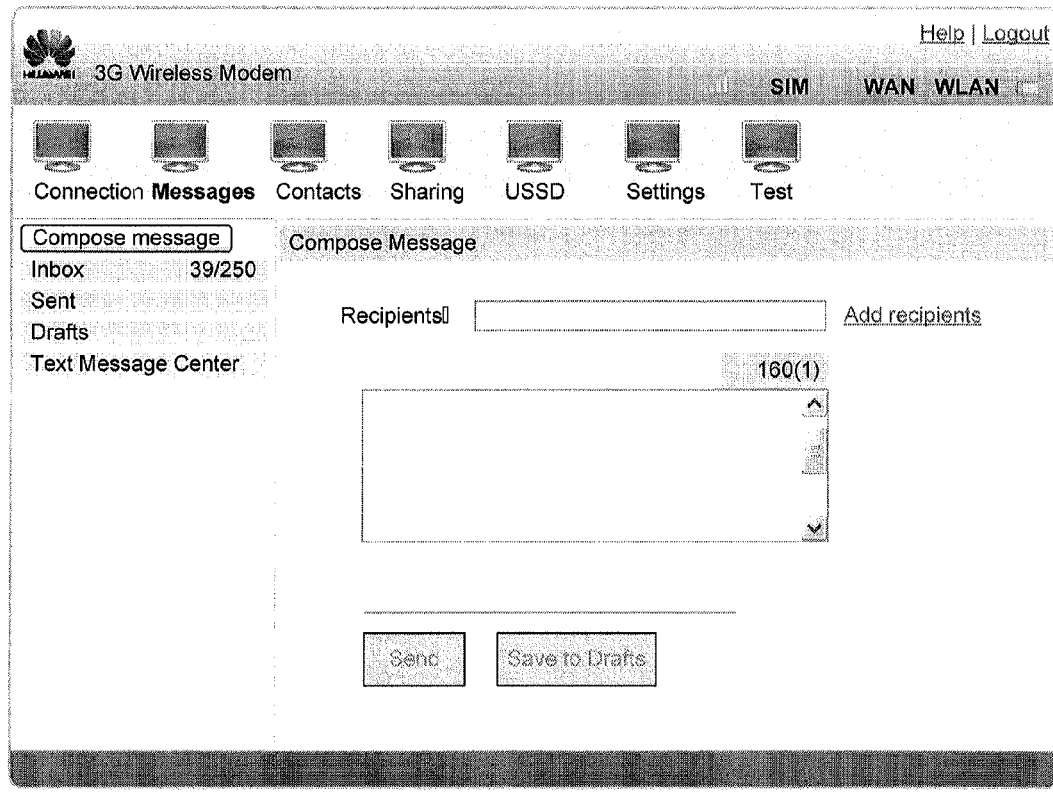
FIG. 6 is a schematic diagram of a Web management page according to an embodiment.

First, in an Internet browser, a user opens the Web management page provided by the Web interface module, and is ready for sending a short message. The Web management page is shown in FIG. 6.

When the user clicks "Send" on the Web management page after editing content of the short message, the Web interface module receives a "Send a short message" command; at this time, the Web service implementing module invokes the "API for sending a short message" defined in interface □. Table 1 is an exemplary definition of "an API request for sending a short message". In this case, the request interface needs to be invoked.

TABLE 1

| Field Name | Type | Length | Description |
| --- | --- | --- | --- |
| number | string | 31 | Telephone number of a recipient |
| Body | string | 1000 | Short message text content to be sent |

The following gives an example of sending a short message whose content is "This is a demo sms text." to a number 13512345678. In this process, the Web protocol stack module is responsible only for API forwarding.

```
"POST /api/sms/send HTTP/1.1
<?xml version="1.0" encoding="UTF-8"?>
<api version="1.0">
    <requ est>
        <number>13512345678</number >
        <body>This is a demo sms text.</body>
    </requ est>
</api>".
```

After the SIL in the Web service implementing module receives the "API request for sending a short message", the API invocation is parsed, and an internal function API interface (interface □ at the lower right of the SIL in FIG. 5) of the SMS service component in the service container submodule is invoked.

Assuming that the SMS service component provides the following internal function API for sending the short message:
int SendSms(String strPhoneNumber, String strBody), the process of parsing the API invocation is as follows:

```
"POST /api/sms/send HTTP/1.1
<?xml version="1.0" encoding="UTF-8"?>
<api version="1.0">
    <request>
        <number>13512345678</number >
        <body>This is a demo sms text.</body>
    </requ est>
</api>".
```

The SIL knows according to "/api/sms/send" that the API is intended for the SMS service, and therefore it is necessary to invoke the SMS API. In addition, the SIL obtains the number of the recipient and the content of the short message according to "<number>13512345678</number>" and "<body>This is a demo sms text.</body>", and therefore the SIL invokes the following function:
SendSms("13512345678", "This is a demo sms text.").

The service container submodule further invokes the internal function API of the SPI layer (interface □ at the lower part of the service container submodule in FIG. 5).

Assuming that the SPI layer provides the following internal function API for sending the short message:
int SPI_SendSms(String strPhoneNumber, String strBody)
the following function is invoked:
SPI_SendSms("13512345678", "This is a demo sms text.").

The SPI will further invoke a lower-layer interface of the MBB device, and will invoke the AT command (interface □ in FIG. 5) for the "send a short message" management command.

After the firmware succeeds in sending the short message or fails to send the short message, a result is returned to the invoker level by level, for example:

```
<?xml version="1.0" encoding="UTF-8"?>
<response>ok</response>.
```

At interface □, if the "response" of the SIL is "OK", it indicates "Sending succeeds". Table 2 describes an example of this response.

TABLE 2

| Field Name | Type | Length | Description |
| --- | --- | --- | --- |
| Response | String | 2 | Execution result of sending the short message |

In the method for managing a mobile broadband device according to this embodiment, the host device manages the mobile broadband device in Web mode. Thereby, the host device using the mobile broadband device does not require a client any longer, which completely solves a problem of cross-platform support of the client and enables the mobile broadband device to have merits of being free from installation, easy development, and low cost.

The following describes a mobile broadband device according to an embodiment.

Figure 7:
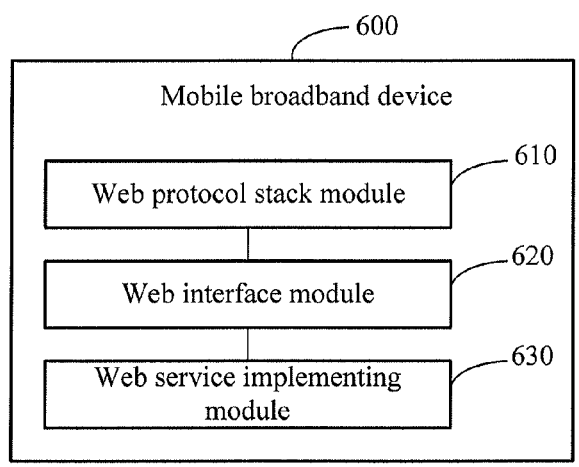
FIG. 7 is a schematic diagram of a mobile broadband device according to an embodiment.

FIG. 7 is a schematic diagram of a mobile broadband device 600 according to an embodiment. As shown in FIG. 7, the mobile broadband device includes a Web protocol stack module 610, a Web interface module 620, and a Web service implementing module 630. The Web protocol stack module 610 is configured to forward data between the Web interface module 620 and the Web service implementing module 630, and the Web protocol stack module 610 is further configured to assist the Web interface module, so that a host device presents a Web management page provided by the Web interface module 620. The Web interface module 620 is configured to provide the Web management page for a user to manage the mobile broadband device in Web mode on the host device, and the Web interface module 620 is further configured to receive a management command that is sent by the user on the Web management page and send the management command to the Web service implementing module 630. The Web service implementing module 630 is configured to receive the management command, and invoke an application programming interface that corresponds to the management command to execute the management command.

The mobile broadband device in this embodiment is managed in Web mode. Thereby, the host device using the mobile broadband device does not require a client any longer, which completely solves a problem of cross-platform support of the client and enables the mobile broadband device to have merits of being free from installation, easy development, and low cost.

In this embodiment, the Web protocol stack module 610 may be further configured to identify whether data sent by the host device is management data or service data, and after determining that the data is the management data, send the management data to the Web interface module 620; the Web interface module 620 may be further configured to enable, via the Web protocol stack module 610, the host device to present the Web management page in the Web interface module 620.

In this embodiment, the Web service implementing module 630 may be further configured to send an execution condition of the management command to the Web interface module 620 via the Web protocol stack module 610; the Web interface module 620 may be further configured to update content of the Web management page based on the execution condition and enable, via the Web protocol stack module 610, the host device to present the updated Web management page.

The foregoing and other operations and/or functions of the Web protocol stack module 610, the Web interface module 620, and the Web service implementing module 630 of the mobile broadband device 600 are intended to implement the corresponding processes of each method in FIG. 1 to FIG. 5 respectively, and are not further described herein for brevity.

Figure 8:
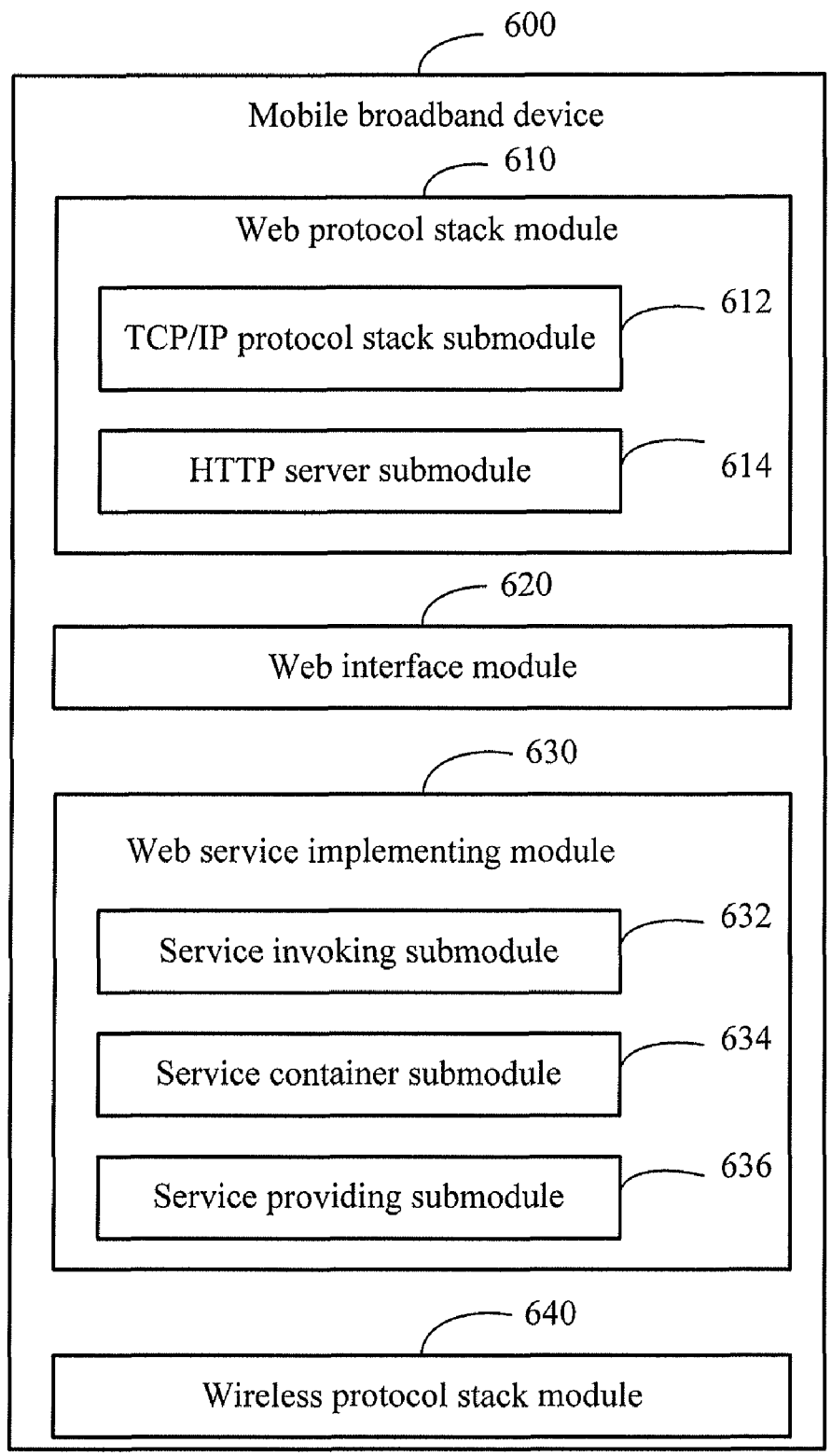
FIG. 8 is a schematic diagram of a mobile broadband device according to another embodiment.

FIG. 8 is a schematic diagram of a mobile broadband device 600 according to another embodiment. As shown in FIG. 8, the mobile broadband device 600 may further include a wireless protocol stack module 640, where the Web protocol stack module 610 may be further configured to forward, after determining that the data is service data, the service data to the wireless protocol stack module 640 of the mobile broadband device, so that the host device accesses a wireless network via the wireless protocol stack module 640.

In this embodiment, the Web protocol stack module 610 may include a TCP/IP protocol stack submodule 612 and an HTTP server submodule 614. The TCP/IP protocol stack submodule 612 may be configured to identify whether the data sent by the host device is management data or service data. The HTTP server submodule 614 may be configured to forward data between the Web interface module 620 and the Web service implementing module 630, and the HTTP server submodule 614 may be further configured to assist the Web interface module, so that the host device presents the Web management page provided by the Web interface module 620, and configured to route the service data to the wireless protocol stack module 640.

In this embodiment, the Web service implementing module 630 may include a service invoking submodule 632 and a service container submodule 634 and/or a service providing submodule 636. The service invoking submodule 632 may be configured to receive the management command and distribute the management command to the service container submodule 634 or the service providing submodule 636. The service container submodule 634 may be configured to execute the management command. The service providing submodule 636 may be configured to exchange information between the service container submodule 634 and the firmware in the mobile broadband device.

The foregoing and other operations and/or functions of all modules and submodules of the mobile broadband device 600 are intended to implement the corresponding processes of each method in FIG. 1 to FIG. 5 respectively, and are not further described herein for brevity.

The mobile broadband device in this embodiment is managed in Web mode. Thereby, the host device using the mobile broadband device does not require a client any longer, which completely solves a problem of cross-platform support of the client and enables the mobile broadband device to have merits of being free from installation, easy development, and low cost.

Persons of ordinary skill in the art may appreciate that various illustrative units and implementation steps described in the embodiments disclosed herein may be implemented by electronic hardware, computer software, or a combination of both. To clearly describe this interchangeability of hardware and software, components and steps of each embodiment are generally described above in terms of functions. Whether these functions are implemented by hardware or software depends upon the particular application and design constraints of the technical solutions. Persons of ordinary skill in the art may implement the described functions in varying ways for each particular application, but such implementation shall not be interpreted as causing a departure from the scope.

The methods or steps described in the embodiments disclosed herein may be implemented by hardware, a software program executed by a processor, or a combination thereof. The software program may be placed in a Random Access Memory (RAM), a memory, a Read Only Memory (ROM), an electrically programmable ROM, an electrically erasable programmable ROM, a register, a hard disk, a removable disk, a Compact Disk-Read Only Memory (CD-ROM), or any other form of storage medium known in the art.

Although reference is made to various drawings and exemplary embodiments, the claims are not limited to such embodiments. Persons of ordinary skill in the art can make equivalent modifications and variations to the embodiments without departing from the spirit and scope of the claims. Such modifications and variations are considered cover by the claims provided that they fall within the scope of claims or equivalents thereof.

What is claimed is:

1. A method for managing a mobile broadband device, wherein the mobile broadband device comprises a Web protocol stack module, a Web interface module, and a Web service implementing module, wherein the Web interface module is an interface part for service implementation, and the method comprises:

identifying, by the Web protocol stack module, whether data sent by a host device is management data or service data;

sending, by the Web protocol stack module after determining that the data is the management data, the management data to the Web interface module;

enabling, by the Web interface module via the Web protocol stack module, the host device to present a Web management page;

receiving, by the Web interface module, a management command from a user via the Web management page of the host device;

sending, by the Web protocol stack module, the management command to the Web service implementing module;

receiving, by the Web service implementing module, the management command, and invoking an application programming interface that corresponds to the management command to execute the management command; and storing, by the Web interface module, the Web management page for a user to manage the mobile broadband device in Web mode on the host device;

wherein the management command comprises a command of a short message service or a phone book service.

2. The method according to claim 1, further comprising: routing, by the Web protocol stack module and after determining that the data is the service data, the service data to a wireless protocol stack module of the mobile broadband device, so that the host device accesses a wireless network via the wireless protocol stack module.

3. The method according to claim 1, wherein identifying, by the Web protocol stack module, whether data sent by the host device is management data or service data comprises:
identifying, by a TCP/IP protocol stack submodule in the Web protocol stack module, whether the data sent by the host device is the management data or the service data.

4. The method according to claim 1, further comprising:
sending, by the Web service implementing module via the Web protocol stack module, an execution condition of the management command to the Web interface module;
updating, by the Web interface module, content of the Web management page based on the execution condition; and
enabling, by the Web interface module via the Web protocol stack module, the host device to present the updated Web management page.

5. The method according to claim 1, wherein:
receiving, by the Web interface module, the management command comprises: receiving, by the Web interface module via an HTTP server submodule in the Web protocol stack module, the management command from the user via the Web management page of the host device;
sending, the Web protocol stack module, the management command to the Web service implementing module comprises: sending, by the Web interface module via the HTTP server submodule, the management command to the Web service implementing module; and
enabling, by the Web interface module via the Web protocol stack module, a host device to present a Web management page comprises: enabling, by the Web interface module via the HTTP server submodule, a host device to present a Web management page.

6. The method according to claim 1, wherein receiving, by the Web service implementing module, the management command, and invoking an application programming interface that corresponds to the management command to execute the management command comprises:
receiving, by a service invoking submodule of the Web service implementing module, the management command, and
distributing the management command to a service container submodule of the Web service implementing module or a service providing submodule of the Web service implementing module to execute the management command, wherein the service container submodule is configured to execute a service operation instruction in the management command, and the service providing submodule is configured to parse the service operation instruction and execute a corresponding lower-layer operation.

7. A mobile broadband device, comprising a processor configured to have a Web interface module, a Web protocol stack module and a Web service implementing module, wherein:
the Web protocol stack module of the processor is configured to:
identify whether data sent by a host device is management data or service data;
after determining that the data is management data, send the management data to the Web interface module;
the Web interface module of the processor is configured to:

provide a Web management page for a user to manage the mobile broadband device in Web mode on the host device;
receive a management command from the host device; and
the Web service implementing module of the processor is configured to invoke an application programming interface corresponding to the management command to execute the management command;
wherein the Web interface module is an interface part for service implementation, and the Web interface module is configured to store the Web management page for a user to manage the mobile broadband device in Web mode on the host device;
wherein the management command comprises a command of a short message service or a phone book service.

8. The mobile broadband device according to claim 7, wherein the Web service implementing module comprises a service invoking submodule and a service container submodule or a service providing submodule, wherein:
the service invoking submodule is configured to receive the management command and distribute the management command to the service container submodule or the service providing submodule;
the service container submodule is configured to execute a service operation instruction in the management command; and
the service providing submodule is configured to parse the service operation instruction and execute a corresponding lower-layer operation.

9. A non-transitory machine readable storage medium having stored thereon at least one codes section for managing a mobile broadband device, wherein the mobile broadband device comprises a Web protocol stack module, a Web interface module, and a Web service implementing module, wherein the at least one code section is executable by a machine to cause the machine to perform acts of:
identifying, by the Web protocol stack module, whether data sent by a host device is management data or service data;
sending, by the Web protocol stack module after determining that the data is the management data, the management data to the Web interface module;
enabling, by the Web interface module via the Web protocol stack module, the host device to present a Web management page;
receiving, by the Web interface module, a management command from a user via the Web management page of the host device;
sending, by the Web protocol stack module, the management command to the Web service implementing module;
receiving, by the Web service implementing module, the management command, and invoking an application programming interface that corresponds to the management command to execute the management command; and
storing, by the Web interface module, the Web management page for a user to manage the wherein the management command comprises a command of a short message service or a phone book service.

10. The non-transitory machine readable storage medium according to claim 9, wherein the at least one code section causes the machine to perform acts of: routing the service data to a wireless protocol stack module of the mobile broadband device, so that the host device accesses a wireless network via the wireless protocol stack module.

11. The non-transitory machine readable storage medium according to claim 9, wherein the at least one code section causes the machine to perform acts of:
   sending an execution condition of the management command to the Web interface module;
   updating content of the Web management page based on the execution condition; and
   enabling the host device to present the updated Web management page.

12. The non-transitory machine readable storage medium according to claim 9, wherein receiving the management command, and invoking an application programming interface that corresponds to the management command to execute the management command comprises:
   receiving the management command, and
   distributing the management command to a service container submodule of the Web service implementing module or a service providing submodule of the Web service implementing module to execute the management command, wherein the service container submodule is configured to execute a service operation instruction in the management command, and the service providing submodule is configured to parse the service operation instruction and execute a corresponding lower-layer operation.

\* \* \* \* \*